A. COLLIER.
BIT AND LIKE BORING TOOL.
APPLICATION FILED FEB. 25, 1919.

1,365,660. Patented Jan. 18, 1921.

Inventor
Arthur Collier
by
Attorney

UNITED STATES PATENT OFFICE.

ARTHUR COLLIER, OF BRIXTON, ENGLAND.

BIT AND LIKE BORING-TOOL.

1,365,660.      Specification of Letters Patent.      Patented Jan. 18, 1921.

Application filed February 25, 1919. Serial No. 279,028.

*To all whom it may concern:*

Be it known that I, ARTHUR COLLIER, a subject of His Majesty the King of England, and resident of Brixton, in the county of London, Kingdom of England, have invented certain new and useful Improvements in or Relating to Bits and like Boring-Tools, of which the following is a specification.

This invention relates to improvements in bits and like boring tools of the type having a resiliently mounted tit or center.

The object of this invention is to provide a boring tool of the above type which will more efficiently and automatically eject the circular disk which is cut out of the material operated upon, such as wood, to render the tool free and enable further cutting operations to be repeated without loss of time.

This invention is chiefly characterized in that the spring is disposed in a recess in a flanged plunger formed or provided with a tit or center and slidably mounted in a tubular extension of the shank of the tool.

The invention will now be described with reference to the accompanying drawings, in which:—

Figure 1:
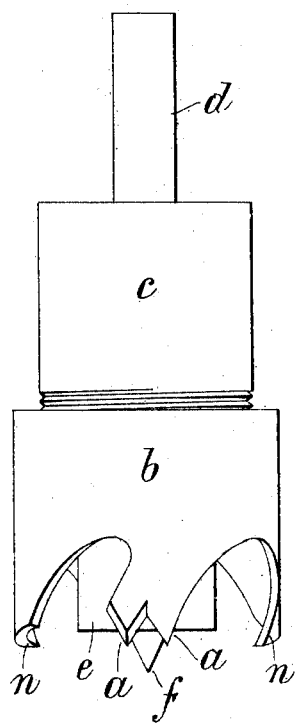
Figure 1 is an elevation.
Figure 2:
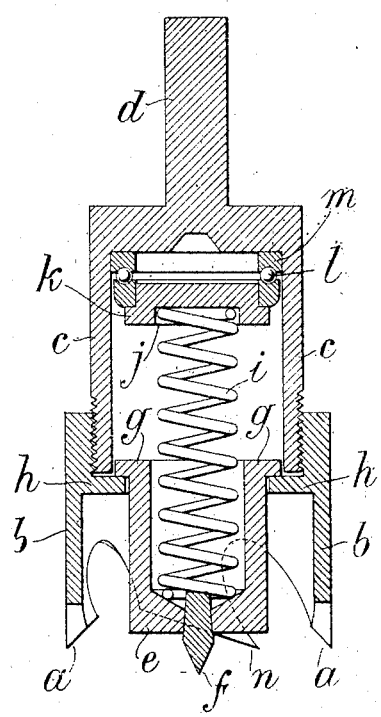
Fig. 2 is a vertical section.
Figure 3:
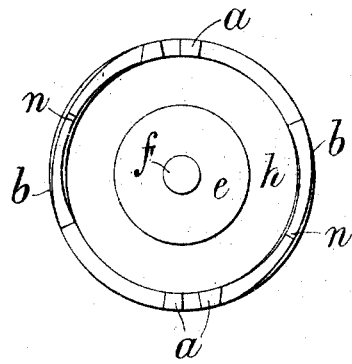
Fig. 3 is an inverted plan.

According to one form of this invention as shown in Figs. 1 to 3 of the drawings, one or more cutters $a$ are formed on a flanged tubular member $b$ which is adapted to be screwed or otherwise secured at its upper end to a tubular extension $c$ formed or provided on the lower end of a shank or the like $d$. This shank $d$ which is of any suitable shape in cross section is adapted to fit in a brace or be revolved in a suitable machine in the ordinary manner. Within the tubular or cutting member $b$ is slidably mounted a flanged plunger $e$ having at its lower end a tit or center $f$ and removable or otherwise for the said bit. The flange $g$ on the said plunger $e$ is adapted to abut against the flange $h$ on the tubular member $b$ to limit the outward movement thereof. A coiled compression spring or the like $i$ is disposed in the said plunger $e$. One end of this spring $i$ is adapted to bear against the lower end of the plunger $e$ and the other end is disposed in a recess $j$ formed in the under side of one portion $k$ of a suitable ball thrust or other bearing $l$ if so desired. The other portion $m$ of this thrust bearing $l$ is disposed in the tubular extension $c$ of the shank $d$. The tubular member $b$ may be provided with a cutting edge around its periphery or one or more cutters such as saw teeth $a$ and one or more markers or cleaners $n$ may be arranged thereon at spaced intervals as shown in the drawings. If desired, the tubular member $b$ could be formed or provided with one depending cutter $a$ and an oppositely disposed edge cutter, marker or cleaner $n$, similar to an ordinary bit.

Figure 4:
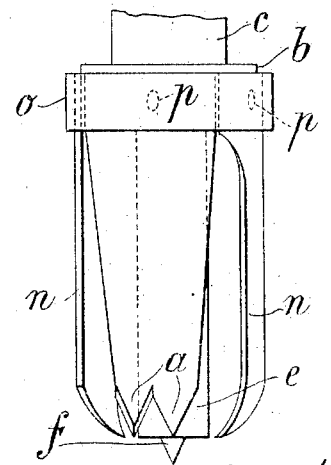
Fig. 4 is a view in elevation showing a modified construction of connecting the cutters in place.

In a slightly modified construction as shown in Fig. 4 the cutters $a$ and cleaners $n$ are detachably secured to the member $b$ or the extension $c$ by a ring $o$ being forced over the said cutters and cleaners. The said cutters $a$ and cleaners $n$ are kept in position by punching a portion of the metal at their upper ends into holes provided in the member $b$, as shown at $p$.

In operation, the shank $d$ is secured in a brace or a suitable machine and rotated in the ordinary manner to cut a hole or a circular disk in the work. The spring pressed plunger $e$ normally remains stationary, and this plunger $e$ is compressed against the thrust bearing $l$ according to the depth the cutter enters the work. The tubular portion $b$ of the bit is rotated on the antifriction thrust bearing $l$ at the upper end of the spring $i$. When the hole or disk is cut out the tool as a whole is removed from the work and the spring pressed plunger $e$ immediately ejects the disk from the interior of the cutter so that another hole or disk can be immediately cut in or from the work without waste of time.

What I claim is:—

A boring tool having a tubular extension, a cutter member exteriorly threaded on said extension and having a flange underlying the free edge of the extension and projecting inwardly thereof, a plunger of hollow construction carrying a center at its lower end, the upper edge of the plunger having a lateral flange to slidably engage and guide the plunger with movement within the tubular extension, and a spring arranged in the tubular extension and bearing within and against the lower end of the plunger, the flange on the cutter member serving to be engaged by the flange on the plunger and limit the movement of the plunger under the influence of the spring.

In testimony whereof I have hereunto signed my name.

ARTHUR COLLIER.